Nov. 28, 1961  A. S. JACOB  3,011,083
CAPACITOR
Filed Dec. 19, 1958
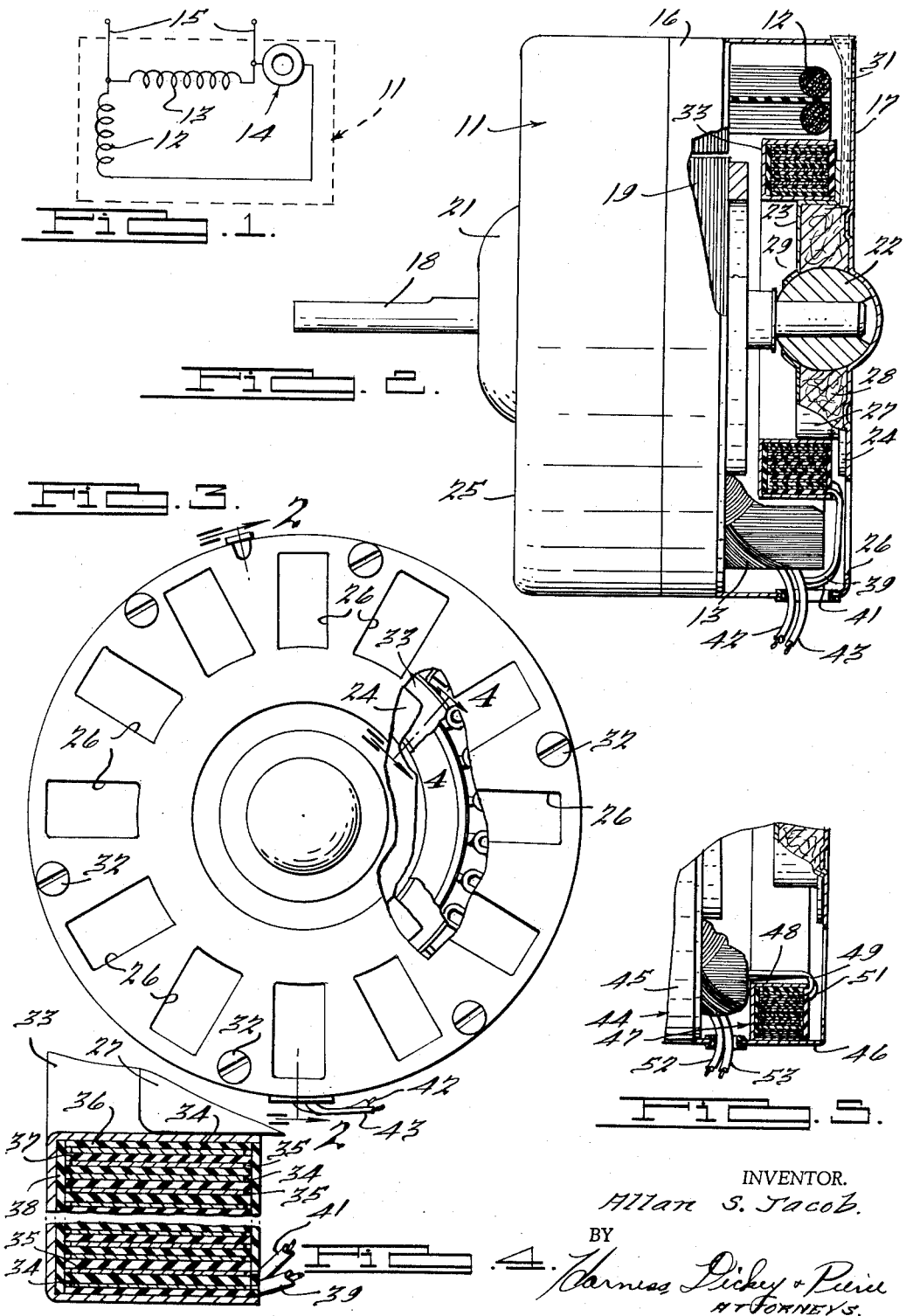
INVENTOR.
Allan S. Jacob.
BY
Harness, Dickey & Pierce
ATTORNEYS.

United States Patent Office 3,011,083
Patented Nov. 28, 1961

3,011,083
CAPACITOR
Allan S. Jacob, Rochester, Mich., assignor to Syncro Corporation, Oxford, Mich., a corporation of Michigan
Filed Dec. 19, 1958, Ser. No. 781,684
4 Claims. (Cl. 310—72)

This invention relates to capacitors, and more particularly to a capacitor construction for use in conjunction with motor and generator circuits.

The use of capacitors in the starting and running circuits of rotating electrical equipment such as induction motors is well known, the capacitor in the case of an induction motor serving to shift the phase of some of the stator windings for starting purposes. Such capacitors, however, have in the past been quite expensive to build and have resulted in a bulky and cumbersome type of assembly which is unsuitable for many purposes. Typically, such capacitors are encased in oblong or cylindrical housings which are mounted on the outside of the motor shell.

It is an object of the present invention to overcome the disadvantages of previously known capacitor motor constructions, and to provide an improved capacitor construction which may be mounted in conjunction with a motor or generator to provide an extremely compact and space-saving assembly.

It is another object to provide an improved capacitor motor construction of this nature which is inexpensive to fabricate, may be applied to various sizes of motors, and in which the labor and assembly costs are substantially reduced.

It is a further object to provide an improved capacitor motor of the above character which will maintain the capacitor in a protected position and will eliminate the necessity for exposed leads connecting the capacitor and the windings.

Other objects, features, and advantages of the present invention will become apparent from the subsequent description, taken in conjunction with the accompanying drawings.

In the drawings:

FIGURE 1 is a wiring diagram showing a typical split-phase induction motor circuit in which the capacitor construction of this invention may be used;

FIGURE 2 is a side elevational view of an induction motor, parts being sectioned, and showing the construction and mounting of the capacitor within the motor;

FIGURE 3 is a front elevational view of the motor, parts being sectioned, and showing the position of the capacitor with respect to the motor shell;

FIGURE 4 is an enlarged fragmentary cross-sectional view of a portion of the capacitor showing the alternate layers of insulative material and conductive foils; and FIGURE 5 is a view similar to FIGURE 2 of a modified form of the invention in which the annular capacitor is mounted immediately inwardly of the motor shell.

In general terms, the illustrated embodiments of the invention comprise a capacitor motor construction in which the capacitor is of annular shape, preferably comprising a pair of conductive foils separated by dielectric material and disposed within an annular casing which is open toward one side. This casing is of such diameter that it may be mounted within the motor shell adjacent the rotor. In a suitable embodiment, in which a circular bearing retainer is provided in the motor having an outwardly facing cylindrical wall, the inner diameter of the capacitor casing is such that the casing may be pressed onto the bearing retainer and carried thereby. In an alternative embodiment, the outer diameter of the capacitor casing is approximately equal to the inner diameter of the end bell of the motor housing and may be carried thereby.

Referring more particularly to the drawings, FIGURE 1 shows a typical capacitor motor circuit to which the invention may be applied. The single phase induction motor is generally indicated at 11 and comprises a first set of stator windings 12 and a second set of stator windings 13. A capacitor generally indicated at 14 is in series with windings 12 across power source 15, while windings 13 are connected directly across the line. With this arrangement, as is well known, auxiliary windings 12 will carry currents which differ in phase from main windings 13 when voltage is applied to line 15, the two sets of poles thus producing a sort of rotating field which starts the motor.

FIGURES 2, 3 and 4 illustrate a capacitor motor of this type constructed according to the invention. Motor 11 has a housing 16 with an end bell 17 at one end thereof, and a shaft 18 extending through the housing. A plurality of main windings 13 and auxiliary windings 12 are carried by stator poles extending inwardly from the central portion of housing 16, and shaft 18 carries a rotor 19 disposed within windings 12 and 13. The thickness of rotor 19 is such that a substantial space exists between the opposite sides of the rotor and the ends of housing 16. Shaft 18 is rotatably supported by a pair of bearings 21 and 22 carried by housing 16 and end bell 17 respectively. These bearings are shown as being of a spherical or self-aligning type and are supported for limited adjusting movement. As is shown with respect to bearing 22, a bearing retainer 23 is provided, this retainer being of circular shape and having a flange 24 secured to the radial wall of end bell 17. This wall as well as end wall 25 of housing 16 is provided with radially extending slots 26 for cooling purposes. An axially extending annular cylindrical surface 27 is provided on retainer 23, this surface being spaced outwardly from bearing 22 to provide a chamber 28 which may be filled with a lubricant-retaining substance. The inner portion 29 of retainer 23 is shaped to support bearing 22. An oil tube 31 extends from the outside of end bell 17 through retainer 23 to chamber 28 along the end bell wall. Bolts 32 are provided for securing the end bell to the housing. It should be understood that other types of bearing constructions could be used within the principles of the invention, the present construction being shown for illustrative purposes.

The construction of capacitor 14 is best seen in FIGURES 2 and 4. The capacitor comprises an annular casing 33 having a channel-shaped cross section open toward one side, which may be fabricated of pressed steel. The inner diameter of casing 33 is approximately equal to the outer diameter of surface 27 of bearing retainer 23, so that the casing may be pressed thereon with or without the use of thin shims. The outer diameter of the casing is sufficient to accommodate the capacitor turns hereinafter described, and the depth (in an axial direction) of the casing is substantially less than the distance between flange 24 of retainer 23 and rotor 19.

As shown in exaggerated form in FIGURE 4, the capacitor elements within casing 33 comprise a pair of strip foil members 34 and 35, these strips being fabricated of electrically conductive material such as aluminum. The strips are separated by strips 36 and 37 of dielectric material such as varnish-impregnated paper. The alternate strips 36, 34, 37 and 35 are wound within casing 33, the conductive strips 34 and 35 being insulated from the casing by strips 36 and 37 as well as by an annular insulative member 38 within casing 33. A first wire 39 is secured to strip 34, and a second wire 41 is likewise secured to strip 35. These wires may be secured to laterally extending tabs (not shown) formed on foils 34 and 35.

The width of the strips are preferably somewhat less than the depth of casing 33, and after the strips are assembled in the casing, an insulative material such as a resin may be poured into the casing, thus sealing the elements therein.

In assembling the capacitor motor constructed according to the invention, capacitor 14 may be simply pressed onto surface 27 of bearing retainer 23. Preferably, the capacitor is mounted so that the open side of casing 33 will face outwardly, thus maintaining leads 39 and 41 in spaced relation with rotor 19 and preventing possible damage to the leads. Leads 39 and 41 may be connected to windings 12 and 13 within housing 16 if desired, so that the only leads extending from the housing are leads 42 and 43 which are to be connected to the line. It should be noted that the presence of oil tube 31 will maintain capacitor 14 a slight distance from the wall of end bell 17, thus permitting leads 39 and 41 to extend from the capacitor. After end bell 17 has been assembled with housing 16 by means of bolts 32, capacitor 14 will be completely enclosed within the motor housing, which will occupy no more space than if the capacitor were not present. Moreover, the capacitor will be completely protected from damage, while not interfering in any way with the passage of air through the motor for cooling purposes or with the function of bearings 21 and 22.

FIGURE 5 shows a modified form of the invention which is generally similar to that of FIGURES 2-4 but in which the capacitor is supported directly by the motor end bell rather than by the bearing retainer. In this embodiment, the motor is generally indicated at 44 and comprises a housing 45 and an end bell 46, these parts carrying bearings for a shaft (not shown). The capacitor is generally indicated at 47 and comprises an annular channel-shaped casing 48 within which the capacitor elements are wound. The outer diameter of casing 48 is approximately the same as the inner diameter of end bell 46, so that the casing may be pressed into position within the end bell prior to assembly of the latter with the housing. In this manner, leads 49 and 51 may serve to connect the capacitor to the stator windings, line leads 52 and 53 extending from the stator winding through the end bell wall. It will be noted that capacitor 47 will not interfere with assembly of the end bell to the motor housing or with circulation of cooling air.

A capacitor motor construction has thus been provided which substantially reduces the overall dimensions of the motor assembly, serves to protect the capacitor and its leads, and results in a reduction in the assembly costs of the motor.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a capacitor motor, a housing having an end bell, a first bearing carried by said housing, a second bearing carried by said end bell, a bearing retainer secured to the inside of said end bell and having an annular cylindrical surface, said second bearing being disposed between said end bell and bearing retainer, a stator winding mounted within said housing, a shaft carried by said bearings, a rotor on said shaft, said rotor being spaced a substantial distance from the outer wall of said end bell, and a capacitor of annular shape mounted on the cylindrical surface of said bearing retainer and electrically connected to said stator winding.

2. The combination according to claim 1, said capacitor comprising an annular casing of channel-shaped cross section having an inner diameter approximately equal to the diameter of said cylindrical bearing retainer surface, a pair of flat electrically conductive strips wound within said casing, and strips of dielectric material separating said electrically conductive strips.

3. The combination according to claim 2, the open side of said capacitor casing facing the outer wall of said end bell and spaced therefrom, and a pair of leads connecting said conductive strips and said stator winding, said leads extending through the space between said capacitor casing and end bell.

4. The combination according to claim 1, said second bearing being a spherical bearing, said end bell and bearing retainer having concave portions holding said spherical bearing, and a chamber formed by said end bell and bearing retainer for holding a lubricant-retaining substance, said annular cylindrical surface on the bearing retainer forming the outer wall of said chamber.

References Cited in the file of this patent
UNITED STATES PATENTS

| | | |
|---|---|---|
| 1,367,982 | Lidseen | Feb. 8, 1921 |
| 2,017,255 | Norton | Oct. 15, 1935 |
| 2,032,129 | Jackson et al. | Feb. 25, 1936 |